United States Patent [19]
Pinnaduwage

[11] Patent Number: 5,892,788
[45] Date of Patent: Apr. 6, 1999

[54] GAS LASER WITH DUAL PLASMA MIXING

[75] Inventor: Lal A. Pinnaduwage, Knoxville, Tenn.

[73] Assignee: Lockheed Martin Energy Research Corporation, Oak Ridge, Tenn.

[21] Appl. No.: 912,905

[22] Filed: Aug. 15, 1997

[51] Int. Cl.[6] .................................................. H01S 3/038
[52] U.S. Cl. ................................ 372/59; 372/58; 372/61; 372/86
[58] Field of Search ............................... 372/55–65, 73, 372/74, 76, 85–87

[56] References Cited

U.S. PATENT DOCUMENTS

| | | | |
|---|---|---|---|
| 3,860,887 | 1/1975 | Hoag et al. | 372/74 |
| 4,025,818 | 5/1977 | Giguere et al. | 372/55 X |
| 4,507,788 | 3/1985 | Barnie et al. | 372/86 X |
| 4,550,408 | 10/1985 | Karning et al. | 372/58 |
| 4,679,201 | 7/1987 | Klingel | 372/61 |
| 4,849,984 | 7/1989 | Hill | 372/58 |

OTHER PUBLICATIONS

Kielkopf et al., "Lasing in Al following photoionization and neutralization in the presence of $H_2$:The role of $H^-$", Phys. Rev. 49 (4) pp. 2675–2680 Apr. (1994).

Iizuka et al., "Effect of electron temperature on negative hydrogen ion production in a low–pressure AR discharge plasma with methane", Appl.Phys.Lett. 63 p. 1619 Sep. (1993).

Pinnaduwage, "Comment in 'Effect of electron temperature on negative hydrogen ion production' . . . ", Appl.Phys.Lett. 67 p. 1034 Aug. (1995).

Primary Examiner—John D. Lee
Attorney, Agent, or Firm—Quarles & Brady

[57] ABSTRACT

A gas laser includes an enclosure forming a first chamber, a second chamber and a lasing chamber which communicates through a first opening to the first chamber and through a second opening to the second chamber. The lasing chamber has a pair of reflectors defining a Fabry-Perot cavity. Separate inlets enable different gases to be introduced into the first and second chambers. A first cathode within the first chamber is provided to produce positive ions which travel into the lasing chamber and a second cathode of a pin-hollow type within the second chamber is provided to produce negative ions which travel into the lasing chamber. A third inlet introduces a molecular gas into the lasing chamber, where the molecular gas becomes excited by the positive and negative ions and emits light which lases in the Fabry-Perot cavity.

20 Claims, 1 Drawing Sheet

GAS LASER WITH DUAL PLASMA MIXING

This invention was made with government support under contract DE-AC05-96OR22464 awarded by the U.S. Department of Energy to Lockheed Martin Energy Research Corporation, and the United States Government has certain rights in this invention.

BACKGROUND OF THE INVENTION

The present invention relates to gas lasers; and more particularly to gas lasers that are capable of continuous wave (CW) lasing action.

Gas lasers typically comprise a chamber containing a gas which emits light when excited by an electric discharge. An anode and a cathode within the chamber are biased to provide electrical excitation of the gas. Mirrors at opposite ends of the chamber form a Fabry-Perot cavity which causes the light emitted by the gas to lase. Some gas lasers are a closed system in that the chamber is sealed with the gas therein, while others have inlets and outlets with the gas flowing through the chamber.

It is often desirable in many applications of lasers to provide continuous lasing action, as opposed to pulsed action. However, conventional lasers can operate in the continuous wave (CW) mode only at certain wavelengths. Thus it is desirable to be able to enable continuous operation at a wider variety of wavelengths within the ultraviolet and visible spectra.

SUMMARY OF THE INVENTION

The general object of the present invention is to provide a gas laser capable of continuous mode operation in a wider variety of wavelengths than is currently achievable with conventional laser designs.

Another object is to provide a device that overcomes discharge instabilities of present day ultraviolet lasers, which prevent operation in a continuous mode.

These and other objectives are satisfied by a laser which employs two separate discharge regions to produce positively and negatively charged plasmas. These plasma, together with long-lived excited states of neutral species from both plasmas, are brought together in a lasing region. Another gas fed into the lasing region undergoes excitation transfer reactions followed by electron attachment reactions producing negative ions. The charge neutralization reactions of the negative ions with positive ions form excited neutrals leading to laser action. An ongoing gas flow is maintained thus sustaining continuous lasing. The present apparatus avoids discharge instabilities associated with present ultraviolet lasers which heretofore prevented their operation in a continuous mode.

Specifically the gas laser comprises an enclosure which forms a first chamber, a second chamber and a lasing region that communicates into the first chamber and the second chamber. The lasing region has a pair of reflectors defining a Fabry-Perot cavity. A first inlet is provides through which to introduce a first gas into the first chamber and a second inlet enables a second gas to be introduced into the second chamber.

A first cathode within the first chamber enables the production of positive ions in response to a first electrical potential being applied to the first cathode with the positive ions traveling into the lasing region. The positive ion either may be ions of the first gas or ions of the cathode metal generated by sputtering of the cathode surface. A second cathode within the second chamber for producing negative ions of the second gas in response to a second electrical potential being applied to the second cathode with the negative ions traveling into the lasing region. The second cathode preferably is a pin hollow cathode type.

A third inlet is provided to introduce a molecular gas into the lasing region, where the molecular gas becomes excited by the positive, negative ions and metastable states of the second gas. This excitation causes the molecular gas to emit light which lases in the Fabry-Perot cavity.

DETAILED DESCRIPTION OF THE INVENTION

Figure 1:
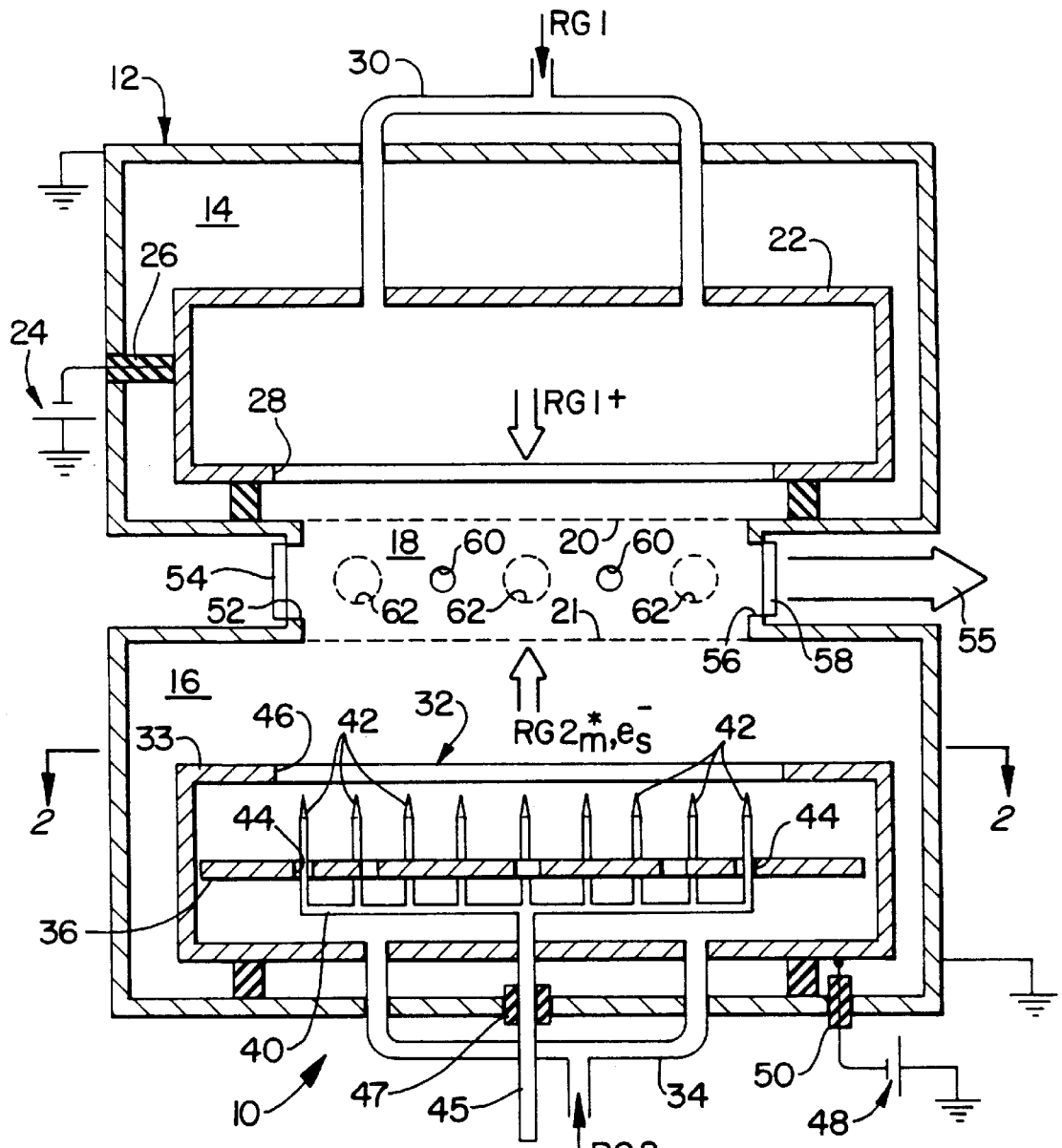
FIG. 1 is a cross-sectional view through a laser according to the present invention.

With initial reference to FIG. 1, a laser 10 according to the present invention comprises an air-tight enclosure 12 of an electrically conductive material. The enclosure 12 defines an internal cavity having a first chamber 14 and a second chamber 16 separated by a lasing chamber 18. Both the first and second chambers 14 and 16 open into the lasing chamber 18 with a conductive grid 20 and 21, respectively, extending across the openings. As will be described, the electrically conductive enclosure serves as an anode for creating electrical discharges within each of the first and second chambers 14 and 16.

The first chamber 14 contains a first hollow cathode 22 formed by a metallic housing having a rectangular, box-like shape, although other geometric shapes may be used. The hollow cathode 22 has an opening 28 which faces the lasing chamber 18. A first rare gas is supplied from an external source through an electrically non-conductive tube 30 to inlets in the hollow cathode 22. The first hollow cathode 22 is connected to the negative terminal of a external first DC power supply 24 via a conductor which extends through an insulating sleeve 26 in the enclosure wall. The positive terminal of the external first DC power supply 24 and the enclosure 12 are connected to earth ground. This establishes an electrical discharge which excites the first rare gas supplied through tube 30.

The second chamber 16 of the enclosure 12 contains a second hollow cathode 32 which has a box-like housing 33 similar to the first hollow cathode 22. An electrically insulating tubing 34 couples an external source of a second rare gas to inlets in the second hollow cathode 32.

Figure 2:
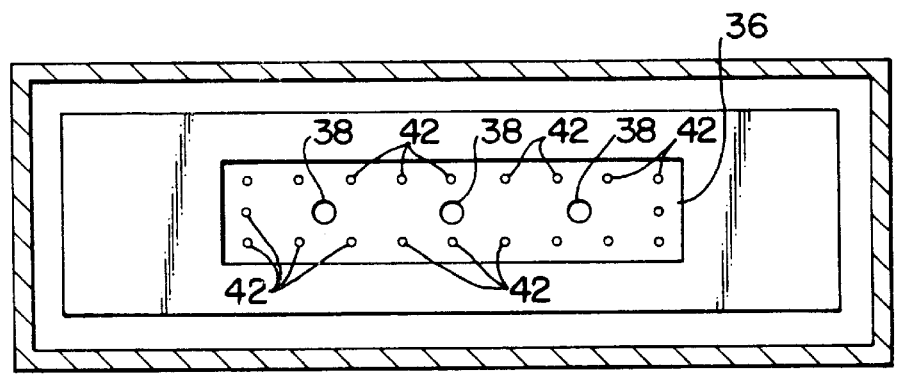
FIG. 2 is a cross-section along line 2—2 of FIG. 1.

With additional reference to FIG. 2, an internal wall 36 extends across the second hollow cathode 32 and has a plurality of openings 38 to allow gas from tubing 34 to flow into all sections of the cathode housing 33. A metal plate 40 is located within the second hollow cathode between the internal wall 36 and the inlets from gas supply tube 34. A plurality of conductive pins 42 extend from the plate 40 toward the lasing chamber 18, passing through apertures 44 in the wall 36. The pins 42 are directed toward an opening 46 in the second hollow cathode 32 which faces the lasing chamber 18. In the particular embodiment of the present invention that is illustrated in the drawings, there are twenty pins arranged in a rectangular pattern on the surface of the plate 40. The metal plate 40 is connected to a driver 45, such as a rod, which passes through an electrically insulating bushing 47 in the enclosure wall. In the orientation of the laser 10 in FIG. 1, the user is able to move the driver 45 vertically to alter the distance that the pins 42 project upward from the interior wall 36. Varying the pin length, alters the glow discharge that is produced in the second chamber, as will be described.

The second hollow cathode 32 is connected to a second DC power supply 48 via a lead that extends through an insulating sleeve 50. Specifically the second hollow cathode 32 is coupled to the negative terminal of the second power supply 48 with the positive terminal being coupled to earth ground. The enclosure 12 also is at ground. This produces an electrical discharge within the second chamber 16.

Both the first and second chambers 14 and 16 open into the lasing chamber 18 through the metal grids 20 and 21. An opening 52 at one end of the lasing chamber 18 is closed by a total reflector 54. Another opening 56 at the opposite end of the lasing chamber 18 is closed by a partial reflector 58, the length between the two reflectors 54 and 58 is selected to form a Fabry-Perot cavity for the desired wavelength. The laser beam is able to pass through the partial reflector 58 as indicated by arrow 55 in FIG. 1. The lasing chamber 18 has a plurality of inlets 60 in the rear wall of the enclosure 12 through which a molecular lasing gas is introduced. The opposite wall of the lasing chamber 18 has a plurality of outlets 62 through which the lasing gas is exhausted from the enclosure.

The excited state responsible for laser emission from the lasing chamber 18 is produced via positive ion/negative ion charge neutralization as defined by the expression $$A^+ + B^- \rightarrow A^* + B \qquad (1)$$

or $$A^+ + B^- \rightarrow AB^* \qquad (2)$$

Depending upon the identity of $A^+$ and $B^-$ and total pressure in the lasing chamber 18, reactions 1 or 2 lead to the population of the lasing state $A^*$ or $AB^*$. Thus, the lasing action requires the production of the positive ions $A^+$ and negative ions $B^-$.

The positive ions are produced in the first hollow cathode 22 of the first chamber 14. A discharge of a flowing rare gas RG1 produces a flow of positive ions, $RG1^+$ into the lasing chamber 18 through the opening 28 in the first hollow cathode and the first grid 20.

The negative ions are produced in the second chamber 16 by the second hollow cathode 32. A second appropriate rare gas RG2 is chosen also depending upon the desired laser transitions and flows into the hollow cathode 32 through the supply tube 34. The electrical discharge produced within the second chamber 16 is controlled by selection of the proper distance that the pins 42 extend from the interior wall 36 toward the opening 46 of the second hollow cathode 32. This discharge can be controlled to produce low-energy electrons designated $e^-_{slow}$ with an electron temperature that is less than 0.5 eV. The low energy electrons are extracted from the second chamber 16 into the lasing chamber 18 along with metastable states of the second rare gas $RG2^*_m$.

A molecular gas M flows into the lasing chamber 18 through inlets 60. Efficient excitation transfer reactions occur forming highly-excited states, $M^{**}$, of that molecule as denoted by the reaction:

$$RG2^*_m + M \rightarrow M^{**} + RG2 \qquad (3)$$

These highly-excited molecules will disassociatively attach slow electrons producing the negative ion B- for reaction (1) as defined by the expression:

$$M^{**} + e^-_{slow} \rightarrow B^- + \text{neutral fragments} \qquad (4)$$

Therefore, both positive ions $A^+$ and negative ions $B^-$ needed for reaction (1) are available within the lasing chamber 18 without having a discharge in that chamber of the laser 10.

EXAMPLE 1

The present laser 10 can be operated at the XeCl excimer laser line. In this case, xenon (Xe) gas flows through supply tube 30 into the first hollow cathode 22 to produce $Xe^+$ ions that flow into the lasing chamber 18 together with metastable atoms $Xe^{*m}$. Argon gas is introduced into the electrical discharge in the second hollow cathode 32 which feeds slow electrons $e^-_{slow}$ and metastable states of argon $Ar^*_m$ into the lasing chamber 18. A lasing gas mixture of He/HCl is supplied directly into the lasing chamber 18 through inlets 60. The helium is used as a buffer to dilute the hydrogen chloride. The interaction of the HCl with the metastable atoms from the two chambers 14 and 16 produce excited states of HCl via the reactions:

$$HCl + Ar^*_m \rightarrow HCl^{**} + Ar \qquad (5)$$

and $$HCl + Xe^*_m \rightarrow HCl^{**} + Xe. \qquad (6)$$

$Cl^-$ ions will be produced via:

$$HCl^{**} + e^-_{slow} \rightarrow H + Cl^- \qquad (7)$$

and the lasing state $XeCl^*$ is produced via:

$$Xe^+ + Cl^- \rightarrow XeCl^*. \qquad (8)$$

Lasing at other excimer laser lines can be obtained by using different gas combinations. Suitable gases can be identified using the following criteria:

(1) The rare gas introduced into the first hollow cathode 22 should yield the positive ion, $A^+$, needed to form the excimer $AB^*$.

(2) The gas which is fed directly into the lasing chamber through inlet 60 should yield the negative ion, $B^-$ needed to form the excimer.

(3) The rare gas introduced into the second hollow cathode 32 should yield the metastable states of energies lying close to the ionization threshold of the molecule which is fed directly into the lasing chamber 18 through inlets 60.

EXAMPLE 2

The present apparatus 10 may also be operated at the 369.2 nm line of aluminum. Such operation had been achieved previously only in the pulsed mode using another laser for excitation. However, the present apparatus 10 can be used to achieve continuous laser operation at this wavelength.

In this case, the first hollow cathode 22 is constructed with aluminum with argon being the first rare gas introduced through tube 30 into the discharge of that cathode. This results in aluminum vapor being produced by sputtering of the first hollow cathode. The aluminum vapor becomes ionized by the metastable states of argon $Ar^*_m$ that are produced in the discharge. Therefore, positive aluminum ions will be extracted from the first chamber 14 into the lasing chamber 18.

In this example, methane is supplied to the lasing chamber 18 through inlets 60. Argon is supplied via tube 34 into the second hollow cathode 32. The discharge of this second hollow cathode 32 also produces the metastable states of argon Ar*$_m$ which also flow from the second chamber 16 into the lasing chamber 18. Thus, the methane (CH$_4$) will be excited via the reaction:

$$Ar^*_m + CH_4 CH_4^{**} + Ar \tag{9}$$

The CH$_4$** thus produced attaches the slow electrons $e^-_{\text{slow}}$, extracted from the pin hollow cathode discharge:

$$CH_4^{**} + e^-_{slow} \rightarrow H^- + CH_3 \tag{10}$$

Charge neutralization of Al$^-$ with H$^+$ leads to the excited state of Al that is responsible for laser action:

$$Al^+ + H^- \rightarrow Al^* + H \tag{11}$$

Lasing at different metal vapor lines also can be obtained using the present apparatus. For example, the 1.43 μm line of cadmium can be obtained by constructing the first hollow cathode 22 with cadmium and utilizing the same configuration as described above with respect to the 369.2 nm line of aluminum.

The present apparatus is unique in that the plasma mixing technique is accomplished by producing positive ions in one discharge chamber and the production of slow electrons is performed in a second discharge chamber. In addition, the production of negative ions in the lasing chamber involves an excitation transfer mechanism followed by an electron attachment reaction, which also is unique in laser design.

I claim:

1. A gas laser comprising:
   a first chamber containing a first gas and a first discharge mechanism for producing a first plasma of positive ions from the first gas;
   a second chamber containing a second gas and a second discharge mechanism for generating a second plasma of electrons and metastable states of the second gas; and
   a lasing chamber in communication with both the first chamber and the second chamber to receive the first and second plasmas, the lasing chamber having an inlet for a third gas which results in light emission upon excitation by the first and second plasmas, and a pair of reflectors forming a Fabry-Perot cavity which causes the light to lase.

2. The laser as recited in claim 1 wherein the second discharge mechanism comprises a hollow housing with an opening that faces the lasing chamber, and a plurality of pins within the hollow housing and projecting toward the opening.

3. The laser as recited in claim 1 wherein the electrons have electron temperatures less than substantially 0.5 eV.

4. The laser as recited in claim 1 wherein the second discharge mechanism comprises a hollow housing with an opening that faces the lasing chamber, a wall within the hollow housing with a plurality of apertures, and a plurality of pins projecting through the plurality of apertures toward the opening, wherein a distance that the pins project from the wall toward the opening is variable by a user.

5. A gas laser comprising:
   an enclosure forming a first chamber, a second chamber and a lasing chamber communicating through a first opening to the first chamber and through a second opening to the second chamber, the lasing chamber having a pair of reflectors defining a Fabry-Perot cavity;
   a first inlet for introducing a first gas into the first chamber;
   a second inlet for introducing a second gas into the second chamber;
   a first cathode within the first chamber for producing positive ions in response to a first electrical potential being applied to the first cathode with the positive ions traveling into the lasing chamber;
   a second cathode within the second chamber for producing a plasma of electrons and metastable states of the second gas in response to a second electrical potential being applied to the second cathode with the plasma traveling into the lasing chamber; and
   a third inlet for introducing molecular gas into the lasing chamber, wherein interacton of the molecular gas with the positive ions and the plasma produces emission of light which lases in the Fabry-Perot cavity.

6. The laser as recited in claim 5 wherein the enclosure is electrically conductive and acts as a common anode for the first and second chambers.

7. The laser as recited in claim 5 wherein the first gas is selected from the group consisting of xenon and argon.

8. The laser as recited in claim 5 wherein the second gas is argon.

9. The laser as recited in claim 5 wherein the molecular gas is selected from the group consisting of hydrogen chloride, a mixture of helium and hydrogen chloride, and methane.

10. The laser as recited in claim 5 wherein the first cathode is formed by a hollow housing into which the first gas is introduced.

11. The laser as recited in claim 5 wherein the second cathode is formed by a hollow housing into which the second gas is introduced.

12. The laser as recited in claim 5 wherein the second cathode is formed by a hollow housing with a cathode opening that faces the second opening, and further comprising a member from which a plurality of pins project toward the cathode opening.

13. The laser as recited in claim 12 wherein the second cathode further comprises a wall within the hollow housing with a plurality of apertures through which the plurality of pins extend, wherein a distance that the pins project from the wall toward the cathode opening is variable by a user.

14. The laser as recited in claim 5 wherein the first cathode is fabricated of a metal which produces a vapor of positive metal ions by sputtering.

15. The laser as recited in claim 5 further comprising a first grid extending across the first opening; and a second grid extending across the second opening.

16. The laser as recited in claim 5 wherein the enclosure further comprises an outlet for exhausting gas from the lasing chamber.

17. A method of producing a laser beam comprising:
    producing a first plasma of positive ions from a first gas within a first chamber;
    producing a second plasma of electrons and metastable states of the second gas within a second chamber;
    introducing a molecular gas M into a lasing chamber which communicates with the first and second chambers and which receives the first and second plasmas; and
    reacting the first and second plasmas with the molecular gas to emit light which lases in a Fabry-Perot cavity formed in the lasing chamber.

18. The method as recited in claim 17 wherein the step of reacting comprises:

forming excited states M of the molecular gas M as denoted by the reaction:

$$RG2^*_m + M \rightarrow M^{**} + RG2$$

where RG2 is the second gas and $RG2^*_m$ is a metastable state of the second gas; and disassociatively attaching electrons from the first plasma to the excited states $M^{**}$ of the molecular gas thereby producing a negative ion B as defined by the expression:

$$M^{**} + e^- \rightarrow B^- + \text{neutral fragments}.$$

19. The method as recited in claim 18 wherein the step of reacting further comprises producing a lasing state of a gas according to the reaction:

$$RG^+ + B^- \rightarrow XeB^*.$$

where $RG^+$ is a positive ion of one of the first gas and the second gas.

20. The laser as recited in claim 17 wherein the electrons have electron temperatures less than substantially 0.5 eV.

* * * * *